United States Patent
Tanaka et al.

(10) Patent No.: US 9,694,842 B2
(45) Date of Patent: Jul. 4, 2017

(54) STEERING DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Eiji Tanaka, Kitakatsuragi-gun (JP); Susumu Imagaki, Tondabayashi (JP); Atsushi Tano, Sakurai (JP); Hiroshi Kawakami, Toyota (JP); Kenji Imamura, Kosai (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/899,614

(22) PCT Filed: Jul. 16, 2014

(86) PCT No.: PCT/JP2014/068857
§ 371 (c)(1),
(2) Date: Dec. 18, 2015

(87) PCT Pub. No.: WO2015/008772
PCT Pub. Date: Jan. 22, 2015

(65) Prior Publication Data
US 2016/0144887 A1    May 26, 2016

(30) Foreign Application Priority Data
Jul. 17, 2013   (JP) ................................ 2013-148879

(51) Int. Cl.
*B62D 1/19*   (2006.01)
*B62D 1/184*  (2006.01)
*B62D 1/187*  (2006.01)

(52) U.S. Cl.
CPC .............. *B62D 1/195* (2013.01); *B62D 1/184* (2013.01); *B62D 1/187* (2013.01)

(58) Field of Classification Search
CPC ........ B62D 1/195; B62D 1/197; B62D 1/192; B62D 1/19; B62D 1/18; Y10S 248/90
(Continued)

(56) References Cited

U.S. PATENT DOCUMENTS 3,697,108 A * 10/1972 Diener .................... B60R 19/36
                                                                              188/371
2005/0066761 A1    3/2005 Arihara
(Continued)

FOREIGN PATENT DOCUMENTS

CN        105283369 A     1/2016
EP        3 009 327 A1    4/2016
(Continued)

OTHER PUBLICATIONS

Jul. 11, 2016 Extended Search Report issued in European Patent Application No. 14827060.6.
(Continued)

*Primary Examiner* — Keith Frisby
(74) *Attorney, Agent, or Firm* — Oliff PLC

(57) ABSTRACT

A first plate of a stationary bracket has long holes which extend parallel to a column movement direction, and through which large-diameter portions of suspension bolts are passed. The inner circumferences of the long holes include: recessed curved surface portions of end portions in a direction opposite to the column movement direction; first inner edge portions which are on the side of a middle position between the long holes; and second inner edge portions. In a secondary collision, when the one suspension bolt slides over the first inner edge portion of the long hole,
(Continued)

for example, a gap is formed between the other suspension bolt and the second inner edge portion of the long hole.

4 Claims, 8 Drawing Sheets

(58) Field of Classification Search
USPC .......... 280/777, 779; 74/492; 188/376, 371; 248/548, 900
See application file for complete search history.

(56) References Cited

U.S. PATENT DOCUMENTS

| | | | |
|---|---|---|---|
| 2006/0214411 A1* | 9/2006 | Ikegaya | B62D 1/19 280/777 |
| 2006/0290128 A1 | 12/2006 | Ridgway et al. | |
| 2008/0012281 A1 | 1/2008 | Cho et al. | |
| 2012/0187669 A1 | 7/2012 | Minamigata et al. | |
| 2012/0267884 A1 | 10/2012 | Fujiwara et al. | |
| 2013/0133460 A1 | 5/2013 | Uesaka | |
| 2015/0314802 A1 | 11/2015 | Tanaka et al. | |
| 2016/0107677 A1 | 4/2016 | Tanaka et al. | |

FOREIGN PATENT DOCUMENTS

| | | |
|---|---|---|
| JP | 2008-018920 A | 1/2008 |
| JP | 2012-121538 A | 6/2012 |
| JP | 2012-148758 A | 8/2012 |
| JP | 2013-112147 A | 6/2013 |
| JP | 2014-166841 A | 9/2014 |

OTHER PUBLICATIONS

Oct. 10, 2016 Office Action issued in the Chinese Patent Application No. 201480039826.7.

* cited by examiner

STEERING DEVICE

TECHNICAL FIELD

The present invention relates to a steering device.

BACKGROUND ART

In a steering device, in succession to a primary collision in which a vehicle collides with another vehicle, a secondary collision in which the driver collides with a steering wheel occurs. In order to absorb shock in the secondary collision, various structures in which a part of a steering column is disengaged from the vehicle body, and moved in the direction of the column shaft have been proposed.

In Patent Reference 1, for example, a suspension bolt which is passed through a through hole configured by a long hole disposed in a base plate section of a vehicle body-side bracket is passed through a sliding blank plate having a pair of sliding plate sections that extend along the upper and lower surfaces of the base plate section. The base plate section of the vehicle body-side bracket is pressingly held between a restraining portion fixed to the suspension bolt and a top plate section of a column-side bracket, through the sliding plate sections, thereby joining and supporting the column-side bracket to the vehicle body-side bracket. In a secondary collision, the sliding blank plate is co-moved with the suspension bolt in the direction of the column shaft.

PRIOR ART REFERENCE

Patent Reference

Patent Reference 1: JP-A-2012-148758

SUMMARY OF THE INVENTION

Problem that the Invention is to Solve

In the case where, in a secondary collision, a load is input obliquely to the steering shaft in a plan view (in the case where the load has a load component in the lateral direction), however, the suspension bolt scrapes against an inner edge portion of the long hole, and prying may be caused because of an effect of a rotation moment due to a braking force which is applied to the suspension bolt by the inner edge portion. In this case, there is a possibility that stable shock absorption cannot be performed.

Therefore, it is an object of the invention to provide a steering device in which stable shock absorption is enabled.

Means for Solving the Problem

In order to attain the object, the invention provides a steering device comprising: a stationary bracket which is fixed to a vehicle body-side member, and which includes a first plate; a movable jacket which is configured to rotatably support a steering shaft in which a steering member is coupled to one end; a movable bracket which is configured to support the movable jacket in a manner that, in a secondary collision, the movable bracket is moved together with the movable jacket in a column movement direction, and which includes a second plate that is opposed to the first plate; and a pair of suspension mechanisms which include a pair of suspension shafts that couple the first plate and the second plate to each other while being passed through long holes which are a pair of first holes that are disposed in the first plate and that extend parallel to the column movement direction, and a pair of second holes of the second plate, the second holes respectively corresponding to the long holes, thereby suspending the movable jacket through the movable bracket, the suspension mechanisms in which a long-hole passing portion of each of the suspension shafts is moved, in a secondary collision, from an initial installed position along the corresponding long hole in the column movement direction, wherein an inner circumference of each of the long holes includes: a recessed curved surface portion which is disposed in an end portion in a direction opposite to the column movement direction; a first inner edge portion which is an inner edge portion on a side of a middle position between the pair of long holes; and a second inner edge portion which is opposed to the first inner edge portion, and, in a secondary collision, when one of the suspension shafts butts against the first inner edge portion of a corresponding one of the long holes, a gap is formed between the other suspension shaft and the second inner edge portion of the corresponding other long hole.

According to the configuration, in a secondary collision, when the long-hole passing portion of one of the suspension shafts slides over the first inner edge portion of the corresponding long hole, a gap is formed between the long-hole passing portion of the other suspension shaft and the second inner edge portion of the corresponding other long hole. Therefore, the occurrence of prying can be suppressed, and stable shock absorption can be performed.

Moreover, the first inner edge portion of each of the long holes may include: a flat surface portion which linearly extends parallel to the column movement direction; and a tapered surface portion which extends in a tangential direction from an end portion of the recessed curved surface portion, and which is connected to the corresponding flat surface portion, the tapered surface portions of the pair of long holes may be inclined oppositely to each other so as to reduce a width between the flat surface portions of the pair of long holes, and taper angles of the tapered surface portions with respect to the column movement direction may be equal to or larger than a friction angle.

According to the configuration, the taper angles of the tapered surface portions of the long holes are equal to or larger than the friction angle, and, also in the case where, in a plan view, the direction of the load input in a second collision, is inclined with respect to the column movement direction, therefore, the long-hole passing portion of one of the suspension shafts which corresponds to the direction of the load input smoothly slides from the initial installed position of the corresponding long hole to the flat surface portion through the tapered surface portion of the first inner edge portion. The first inner edge portion is closer to the middle position between the pair of long holes than the second inner edge portion. Therefore, a rotation moment due to a reaction force which is applied from the first inner edge portion to the suspension shaft can be reduced. As a result, the occurrence of prying can be further suppressed, and more stable shock absorption can be performed.

MODE FOR CARRYING OUT THE INVENTION

A preferred embodiment of the invention will be described with reference to the accompanying drawings.

Figure 1:
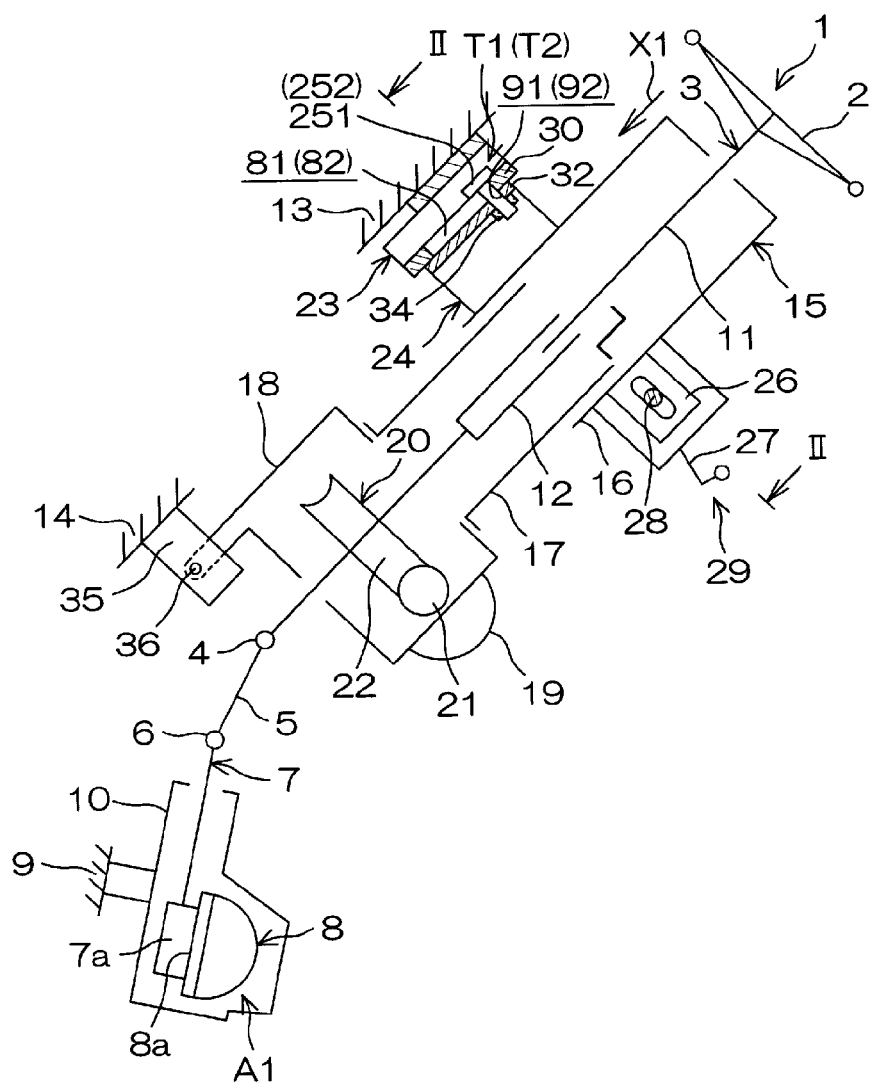
FIG. 1 is a diagrammatic side view of a steering device of an embodiment of the invention, and schematically shows the configuration of the steering device.

FIG. 1 is a diagrammatic view schematically showing the configuration of a steering device of an embodiment of the invention. Referring to FIG. 1, the steering device 1 includes: a steering shaft 3 which is coupled to a steering member 2 such as a steering wheel; an intermediate shaft 5 which is coupled to the steering shaft 3 through a universal joint 4; a pinion shaft 7 which is coupled to the intermediate shaft 5 through a universal joint 6; and a rack shaft 8 functioning as a steering shaft having a rack 8a which meshes with a pinion 7a disposed in the vicinity of an end portion of the pinion shaft 7.

A steering mechanism A1 is configured by a rack and pinion mechanism including the pinion shaft 7 and the rack shaft 8. The rack shaft 8 is supported by a housing 10 fixed to a vehicle body-side member 9, so as to be movable in the axial direction (direction perpendicular to the sheet) extending along the lateral direction of a vehicle. End portions of the rack shaft 8 are not illustrated, but are coupled to respective steered wheels through a corresponding tie rod and a corresponding knuckle arm.

The steering shaft 3 has an upper shaft 11 and lower shaft 12 which are coupled to each other by using, for example, a spline coupling so as to be co-rotatable and axially relatively movable. The steering shaft 3 are rotatably supported by a steering column 15 fixed to vehicle body-side members 13, 14, through a bearing which is not shown.

The steering column 15 includes a tubular upper jacket 16 (movable jacket), and tubular lower jacket 17 which are fitted to each other so as to be axially relatively movable, and a housing 18 which is coupled to the axial lower end of the lower jacket 17. A reduction mechanism 20 which reduces the power of an electric motor 19 for assisting the steering, and which transmits the reduced power to the lower shaft 12 is housed in the housing 18. The reduction mechanism 20 has a driving gear 21 which is co-rotatably coupled to a rotation shaft (not shown) of the electric motor 19, and a driven gear 22 which meshes with the driving gear 21 to co-rotate with the lower shaft 12.

The steering device 1 is configured by the steering shaft 3 and the steering column 15, and in addition a stationary bracket 23, tilt bracket 24, suspension mechanisms T1, T2, locking mechanism 29, coupling/decoupling mechanism R1, and the like which will be described later.

Although the embodiment will be described with reference to an example in which the steering device 1 is applied to an electric power steering device, the invention may be applied also to a manual steering device. Although the embodiment will be described with reference to an example in which the steering device 1 is tilt-adjustable, the invention may be applied also to a steering device which is not provided with a tilt adjusting function, or that which is tilt-adjustable and telescopically adjustable.

Figure 2:
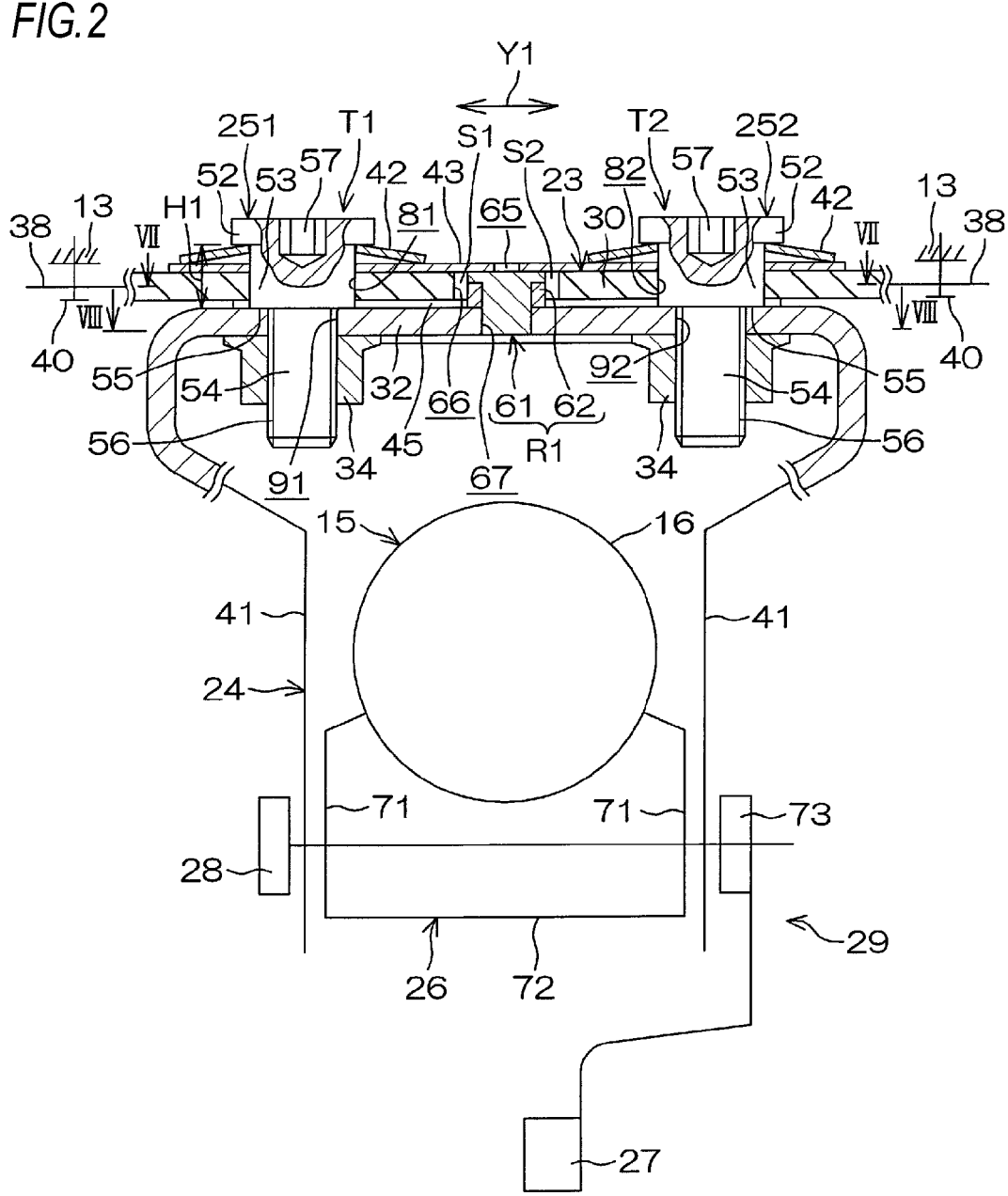
FIG. 2 is a diagrammatic sectional view of the steering device of FIG. 1, and shows a section taken along line II-II in FIG. 1.

As shown in FIG. 2 which is a diagrammatic sectional view, the steering device 1 includes the pair of suspension mechanisms T1, T2 in which the upper jacket 16 is suspended by the stationary bracket 23 through the tilt bracket 24 functioning as the movable bracket. As shown in FIGS. 1 and 2, namely, the tilt bracket 24 functioning as the movable bracket is suspended from the stationary bracket 23 fixed to the vehicle body-side member 13, through suspension bolts 251, 252 functioning as the suspension shafts of the suspension mechanisms T1, T2. By contrast, a column bracket 26 is fixed to the upper jacket 16 of the steering column 15.

As shown in FIGS. 1 and 2, the steering device 1 includes the locking mechanism 29 which, in accordance with an operation performed on an operation lever 27, the position of the column bracket 26 which has undergone the tilt adjustment (therefore, the positions of the upper jacket 16 and the steering member 2) is locked or unlocked through the tilt bracket 24 by using a fastening shaft 28.

Figure 3:
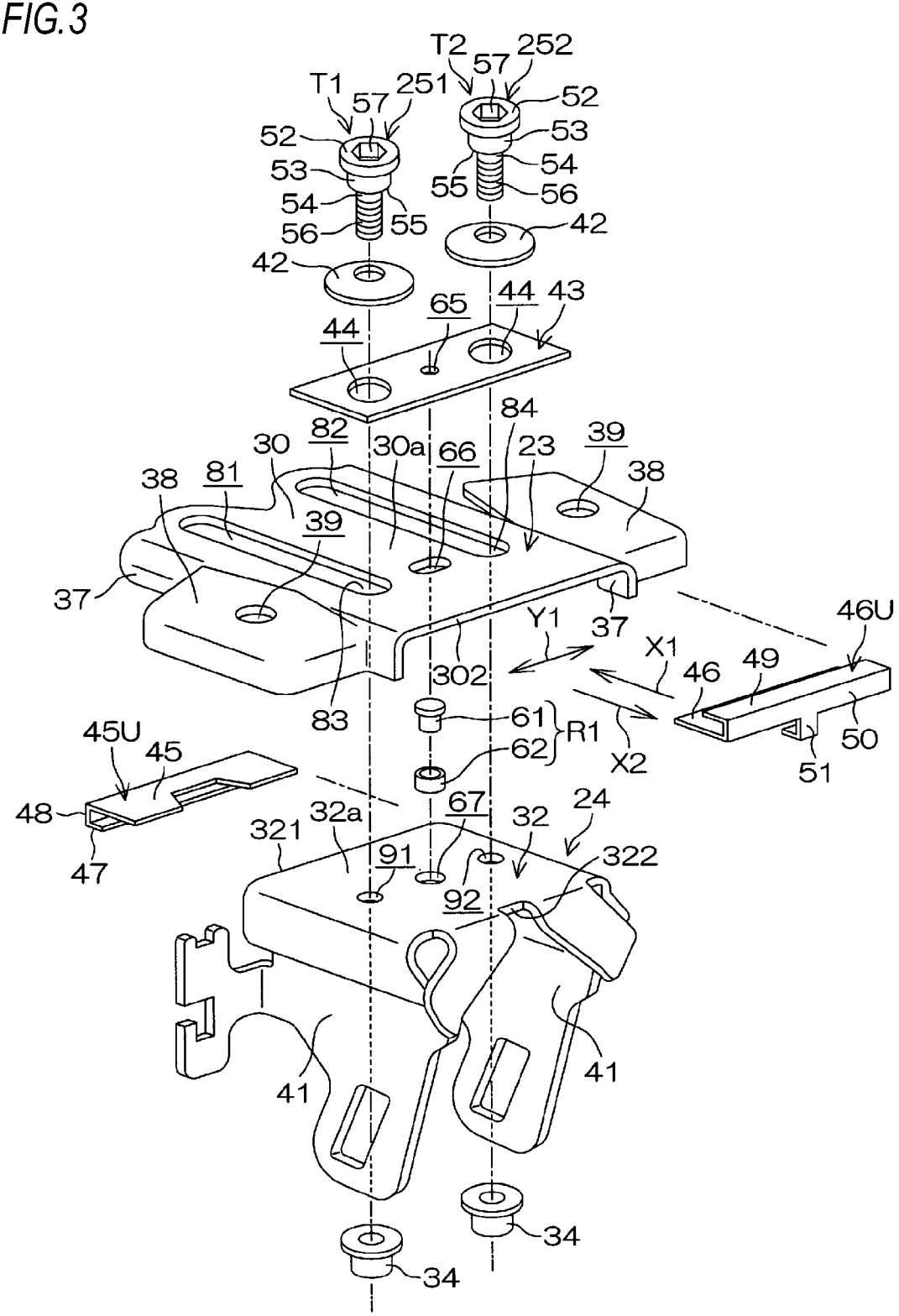
FIG. 3 is an exploded perspective view of the steering device of FIG. 1.

As shown in FIGS. 2 and 3, the tilt bracket 24 includes a pair of side plates 41. As shown in FIG. 2, the column bracket 26 has a groove-like shape including a pair of side plates 71 which are opposed to the pair of side plates 41 of the tilt bracket 24, respectively, and a coupling plate 72 through which the lower ends of the pair of side plates 71 are coupled to each other.

Referring to FIG. 2, the fastening shaft 28 is configured by a bolt which is passed through the side plates 41, 71 of the tilt bracket 24 and the column bracket 26. When a nut 73 screwed with the fastening shaft 28 is rotated by an operation of rotating the operation lever 27, the side plates 41, 71 are fastened together between the head of the bolt functioning as the fastening shaft 28 and the nut 73, thereby locking the side plates 41, 71. Therefore, the position of the steering member 2 after the tilt adjustment is locked, and the tilt locking is accomplished.

Figure 5:
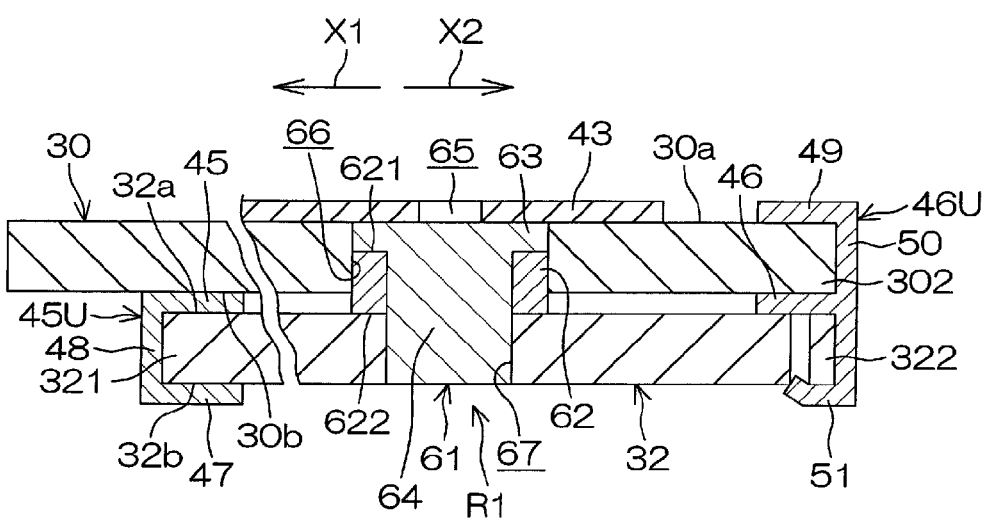
FIG. 5 is a sectional view of a coupled state of first and second plates of the steering device of FIG. 1, and shows a section in the anteroposterior direction including the axis of a resin pin.
Figure 6:
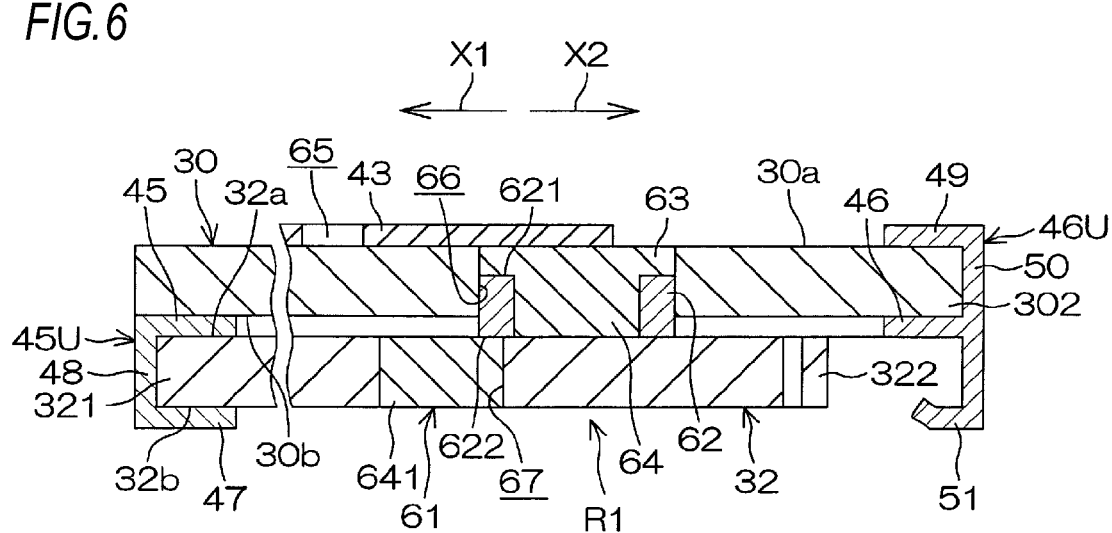
FIG. 6 is a sectional view of the of first and second plates of the steering device of FIG. 1 in a secondary collision, and shows a state where the second plate escapes from a predetermined position of the first plate in the column movement direction by sharing of the resin pin.

The steering device 1 includes the coupling/decoupling mechanism R1 through which a first plate 30 of the stationary bracket 23 and a second plate 32 of the tilt bracket 24 are coupled to each other, and which, in a second collision, the second plate 32 escapes from a predetermined position (position shown in FIG. 5) of the first plate 30 in a column movement direction X1 as shown in FIG. 6.

Figure 4:
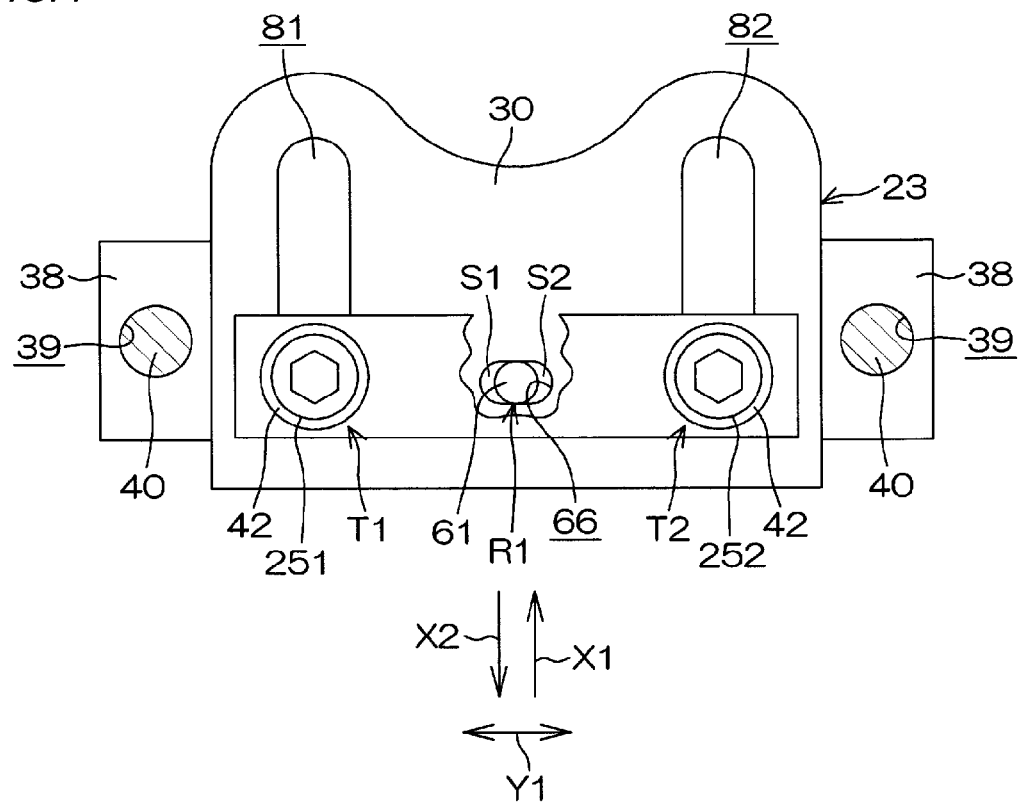
FIG. 4 is a partially cutaway diagrammatic plan view of a stationary bracket, suspension mechanisms, and coupling/decoupling mechanism of the steering device of FIG. 1.

As shown in FIG. 2 and FIG. 4 which is a partially cutaway diagrammatic plan view, the coupling/decoupling mechanism R1 is placed between the pair of suspension mechanisms T1, T2 (i.e., between long holes 81, 82 functioning as the pair of first holes (described later) of the first plate 30 of the stationary bracket 23) with respect to a direction Y1 that is perpendicular to the column movement direction X1. Specifically, the coupling/decoupling mechanism R1 is placed in the middle position between the pair of long holes 81, 82 (i.e., between the pair of suspension bolts 251, 252) with respect to the direction Y1 that is perpendicular to the column movement direction X1.

Referring to FIG. 1, the stationary bracket 23 includes the first plate 30 which is parallel to the column movement direction X1 (corresponding to the axial direction of the steering shaft 3) in a secondary collision. In the first plate 30, the long holes 81, 82 (first holes) for the suspension mechanisms T1, T2 and extending parallel to the column movement direction X1 are formed. By contrast, the tilt bracket 24 (movable bracket) includes the second plate 32 which is opposed to the first plate 30. In the second plate 32, circular holes 91, 92 (second holes) opposed to parts of the long holes 81, 82, and for the suspension mechanisms T1, T2 are formed.

Each of the suspension bolts 251, 252 is configured by a bolt which is passed through the corresponding long hole 81, 82 of the first plate 30, and the corresponding circular hole 91, 92 of the second plate 32, and which is screwed with a nut 34. The suspension bolts 251, 252 which cooperate with the nuts 34 to couple the first plate 30 and the second plate 32 with each other suspend the upper jacket 16 (movable jacket) through the tilt bracket (movable bracket) and the column bracket 26. In a secondary collision, the suspension bolts 251, 252 are movable in the column movement direction X1 along the corresponding long holes 81, 82 together with the tilt bracket 24 (movable bracket), the column bracket 26, and the upper jacket 16.

A lower bracket 35 which is fixed to the vehicle body-side member 14 supports a tilt center shaft 36 functioning as a pivot shaft. The tilt center shaft 36 supports the lower jacket 17 through the housing 18 of the steering column 15, so as to be swingable about the tilt center shaft 36.

As shown in FIGS. 2 and 3, each of the suspension mechanisms T1, T2 is configured by the corresponding suspension bolt 251, 252, a plate spring 42 formed by, for example, a disc spring, the nut 34, and the like. The coupling/decoupling mechanism R1 is configured by a resin pin 61 which is to be sheared in a secondary collision, and a cylindrical collar 62 which is fitted to a part in the axial direction of the resin pin 61. The collar 62 is formed by a material (for example, a metal such as iron or aluminum, or high hardness resin or ceramic) which is higher in hardness than the resin forming the resin pin 61.

Referring to FIG. 3, the stationary bracket 23 includes a pair of side plates 37 which are downward extended from a pair of side edges of the first plate 30, and a pair of attachment plates 38 which are extended outwardly and laterally from the pair of side plates 37, respectively. The stationary bracket 23 is formed by, for example, sheet metal work. The attachment plates 38 are fixed to the vehicle body-side member 13 by fixing bolts 40 (see FIG. 4) which are passed through screw passing holes 39 (see FIGS. 3 and 4) disposed in the attachment plates 38, respectively. Therefore, the stationary bracket 23 is fixed to the vehicle body-side member 13.

In the first plate 30 of the stationary bracket 23, referring to FIGS. 2 to 4, the pair of long holes 81, 82 are pairingly formed correspondingly with the pair of suspension bolts 251, 252. The pair of long holes 81, 82 extend parallel to the column movement direction X1 in a secondary collision, and are separated from each other in the direction Y1 that is perpendicular to the column movement direction X1.

As shown in FIGS. 2 and 3, the tilt bracket 24 (movable bracket) is formed by, for example, sheet metal work. The tilt bracket 24 includes the second plate 32, and a pair of side plates 41 which are downward extended from a pair of side edges of the second plate 32, and is formed into a groove-like shape. As shown in FIGS. 2 and 3, portions where the second plate 32 is coupled to the side plates 41 may be formed into an arcuate shape.

In the second plate 32 of the tilt bracket 24, the pair of circular holes 91, 92 are disposed correspondingly with the pair of suspension bolts 251, 252. Each of the suspension bolts 251, 252 is sequentially passed through the annular plate spring 42 formed by, for example, a disc spring, a corresponding through hole 44 of a first interposed plate 43, the corresponding long hole 81, 82 of the first plate 30, and the corresponding circular hole 91, 92 of the second plate 32, and then screwed with the nut 34. According to the configuration, the suspension bolts 251, 252 suspend the tilt bracket 24.

As shown in FIGS. 3 and 4, the first interposed plate 43 is configured by a long plate which extends in the direction Y1 that is perpendicular to the column movement direction X1, and, as shown in FIG. 2, interposed between the plate springs 42 and the upper surface 30a of the first plate 30. In the first interposed plate 43, at least the surface 30a on the side of the first plate 30 is configured by a low-friction material such as a fluorine resin. Namely, the whole of the interposed plate 43 may be configured by a low-friction material, or the surface of the first interposed plate 43 on the side of the first plate 30 may be covered with a low-friction material.

A second interposed plate 45 and third interposed plate 46 which, in a secondary collision, reduce the sliding resistance in the movement of the second plate 32 in the column movement direction X1 with respect to the first plate 30 are interposed.

The second interposed plate 45 constitutes a groove-like unit 45U which is engaged with a first end portion 321 that is an end portion in the column movement direction X1 of the second plate 32. Namely, the unit 45U includes: the second interposed plate 45 which extends along the upper surface 32a of the second plate 32 and the lower surface 30b of the first plate 30; an opposing plate 47 which is opposed to the second interposed plate 45, and which extends along the lower surface 32b of the second plate 32; and a coupling plate 48 which couples the second interposed plate 45 with the opposing plate 47, and which butts against the edge in the column movement direction X1 of the second plate 32.

In the second interposed plate 45, at least the surface on the side of the first plate 30 is configured by a low-friction material such as a fluorine resin. Namely, the second interposed plate 45 or the unit 45U may be configured by a low-friction material, or the surface of the second interposed plate 45 on the side of the first plate 30 may be covered with a low-friction material.

The third interposed plate 46 constitutes a unit 46U which is engaged with a second end portion 302 that is an end portion of the first plate 30 opposite to the column movement direction X1, and a second end portion 322 that is an end portion of the second plate 32 opposite to the column movement direction X1. Namely, the unit 46U includes the third interposed plate 46 which extends along the upper surface 32a of the second plate 32 and the lower surface 30b of the first plate 30, and an opposing plate 49 which is opposed to the third interposed plate 46, and which extends along the upper surface 30a of the first plate 30. The unit 46U further includes a coupling plate 50 which couples the third interposed plate 46 with the opposing plate 49, and which butts against the edge of the first plate 30 opposed to the column movement direction X1, and an engaging portion 51 which is to be hookingly engaged with the second end portion 322 of the second plate 32, and which has, for example, a hook-like shape.

In the third interposed plate 46, at least the surface on the side of the second plate 32 is configured by a low-friction material such as a fluorine resin. Namely, the third interposed plate 46 or the unit 46U may be configured by a low-friction material, or the surface of the third interposed plate 46 on the side of the second plate 32 may be covered with a low-friction material.

As shown in FIGS. 2 and 3, each of the suspension bolts 251, 252 includes: a head portion 52; a large-diameter portion 53 which is continuous to the head portion 52, which is smaller in diameter than the head portion 52, and which functions as the long-hole passing portion; a small-diameter portion 54 which is continuous to the large-diameter portion 53, and which is smaller in diameter than the large-diameter portion 53; a step portion 55 which is formed between the large-diameter portion 53 and the small-diameter portion 54; and a threaded portion 56 which is disposed in the small-diameter portion 54. A tool engagement part 57 which has, for example, a hexagonal hole shape is disposed in the head portion 52.

As shown in FIG. 2, the large-diameter portion 53 (long-hole passing portion) is passed through the annular plate spring 42, the through hole 44 of the first interposed plate 43, and the corresponding long hole 81, 82 of the first plate 30. The step portion 55 butts against the upper surface 32a of the second plate 32 to be received by the upper surface 32a. The second plate 32 is pressingly held between the step portion 55 and the nut 34, and the suspension bolts 251, 252 and the second plate 32 are fixed.

The distance H1 (corresponding to the shaft length of the large-diameter portion 53) between the head portion 52 and the step portion 55 is made larger than the total of the thickness of the second interposed plate 45 (or that of the third interposed plate 46) which is interposed between the first plate 30 and the second plate 32, that of the first plate 30, that of the first interposed plate 43 which extends along the upper surface 30a of the first plate 30, and that of the plate springs 42 in the most compressed state. Therefore, the plate springs 42 elastically urges the first plate 30 toward the second plate 32 through the first interposed plate 43.

The resin pin 61 of the coupling/decoupling mechanism R1 includes a head portion 63 which has, for example, a circular section, and a shaft portion 64 which is a columnar portion that is smaller in diameter than the head portion 63. The cylindrical collar 62 is fitted to the outer circumference of the shaft portion 64. The outer diameter of the collar 62 is equal to that of the head portion 63 of the resin pin 61. A first end portion 621 in the axial direction of the collar 62 butts against the head portion 63 of the resin pin 61, and a second end portion 622 in the axial direction of the collar 62 is received by the upper surface 32a of the second plate 32. Therefore, the resin pin 61 and the collar 62 are prevented from slipping off toward the side under the second plate 32.

By contrast, the first interposed plate 43 is placed so as to cover the upper side of the head portion 63 of the resin pin 61, thereby preventing the resin pin 61 from upwardly slipping off. In the first interposed plate 43, a peep hole 65 which is smaller than the outer diameter of the head portion 63 of the resin pin 61 is formed so as to be opposed to the head portion 63. After assembling the coupling/decoupling mechanism R1, when the head portion 63 of the resin pin 61 is viewed through the peep hole 65 of the first interposed plate 43, it is possible to easily determine whether a working failure such as a failure of attachment of the resin pin 61 occurs or not.

The head portion 63 of the resin pin 61 and the most part of the collar 62 are passed through a first hole 66 of the first plate 30 of the stationary bracket 23, and for the coupling/decoupling mechanism R1. A part of the collar 62 is projected from the first hole 66. A part 641 which is in a shaft portion of the resin pin 61, and which is projected from the collar 62 is passed through a second hole 67 of the second plate 32 of the tilt bracket 24 (movable bracket), and for the coupling/decoupling mechanism R1. In a secondary collision, as shown from FIG. 5 to FIG. 6, in accordance with relative movement of the first plate 30 and the second plate 32, the part 641 of the shaft portion 64 of the resin pin 61 is sheared so as to be separated from the remaining part.

Figure 7:
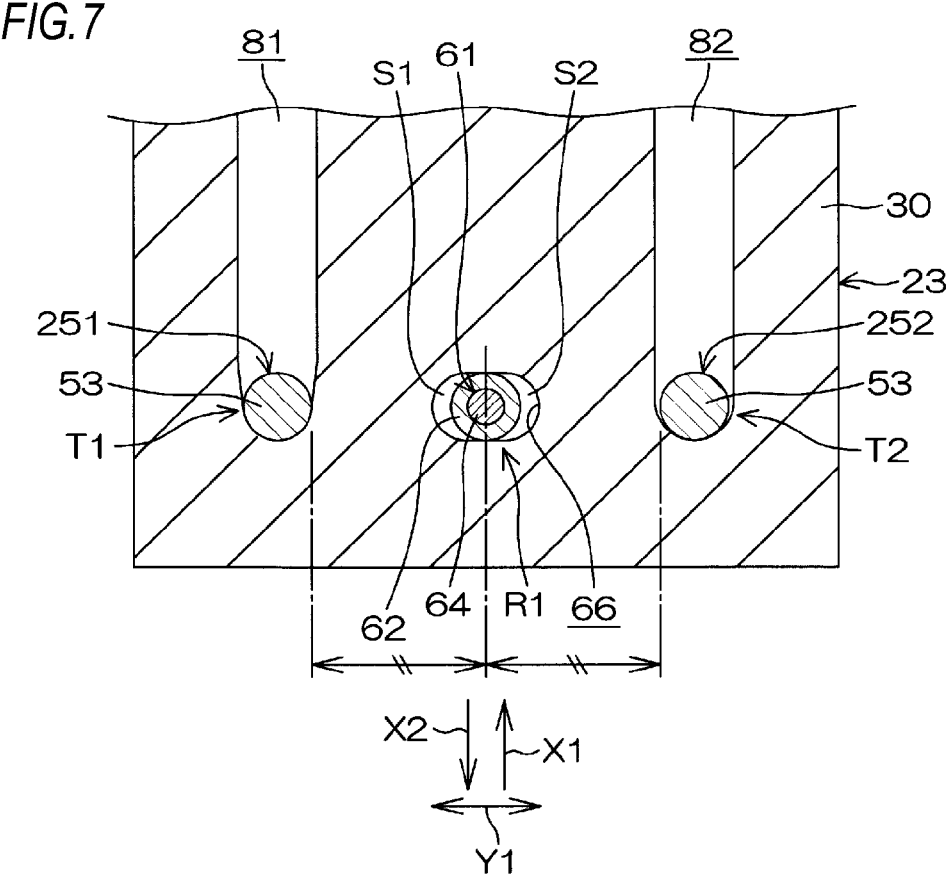
FIG. 7 is a sectional view taken along line VII-VII in FIG. 2, and shows sections of the first plate, suspension bolts, and the coupling/decoupling mechanism.

As shown in FIG. 7 which shows a section taken along line VII-VII in FIG. 2, the first hole 66 of the first plate 30, and for the coupling/decoupling mechanism R1 is placed in the middle position between the long holes 81, 82 for the pair of suspension mechanisms T1, T2 with respect to the direction Y1 that is perpendicular to the column movement direction X1. That is, the resin pin 61 is placed in the middle position between the pair of suspension bolts 251, 252 with respect to the direction Y1 that is perpendicular to the column movement direction X1. In each of the suspension bolts 251, 252, the large-diameter portion 53 functioning as the long-hole passing portion is passed through the corresponding long hole 81, 82.

The first hole 66 of the first plate 30, and for the coupling/decoupling mechanism R1 is formed as a laterally long hole which is long in the direction Y1 that is perpendicular to the column movement direction X1. Therefore, gaps S1, S2 are formed between the outer circumference of the collar 62 and the inner circumference of the first hole 66 with respect to the direction Y1 that is perpendicular to the column movement direction X1.

Because of the gaps, even when a somewhat positional displacement is caused, in the direction Y1 that is perpendicular to the column movement direction X1, between the first plate 30 and the second plate 32 by any external force in transportation or installation, the resin pin 61 is not sheared.

Figure 8:
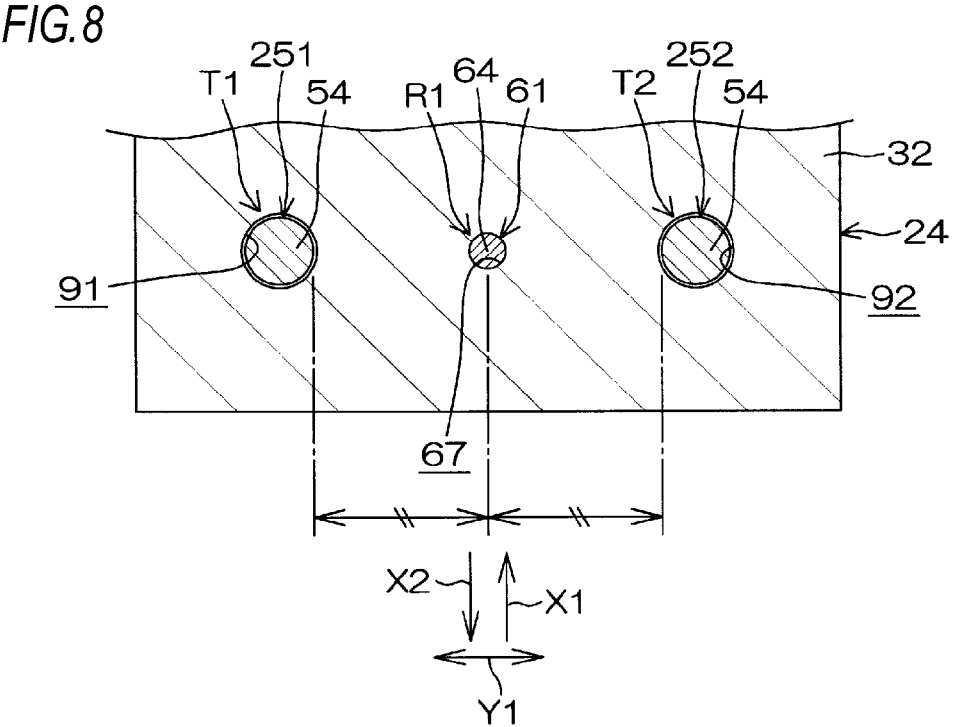
FIG. 8 is a sectional view taken along line VIII-VIII in FIG. 2, and shows sections of the second plate, the suspension bolts, and the coupling/decoupling mechanism.

As shown in FIG. 8 which shows a section taken along line VIII-VIII in FIG. 2, the second hole 67 of the second plate 32 of the tilt bracket 24, and for the coupling/decoupling mechanism R1 is placed in the middle position between the pair of circular holes 91, 92 for the pair of suspension mechanisms T1, T2 with respect to the direction Y1 that is perpendicular to the column movement direction X1. The second hole 67 is formed by a circular hole which has an inner diameter that is equal to or slightly larger than the outer diameter of the shaft portion 64 of the resin pin 61. The small-diameter portions 54 of the corresponding suspension bolts 251, 252 are passed through the circular holes 91, 92, respectively.

In a secondary collision, the shaft portion 64 of the resin pin 61 is sheared by displacement between the matching surfaces of the second end portion 622 of the collar 62 and the second plate 32. A shearing edge configured by the inner peripheral edge of the second end portion 622 of the collar 62 has an arcuate shape, and also a shearing edge configured by the edge portion of the second hole 67 of the second plate 32 has an arcuate shape.

Figure 9:
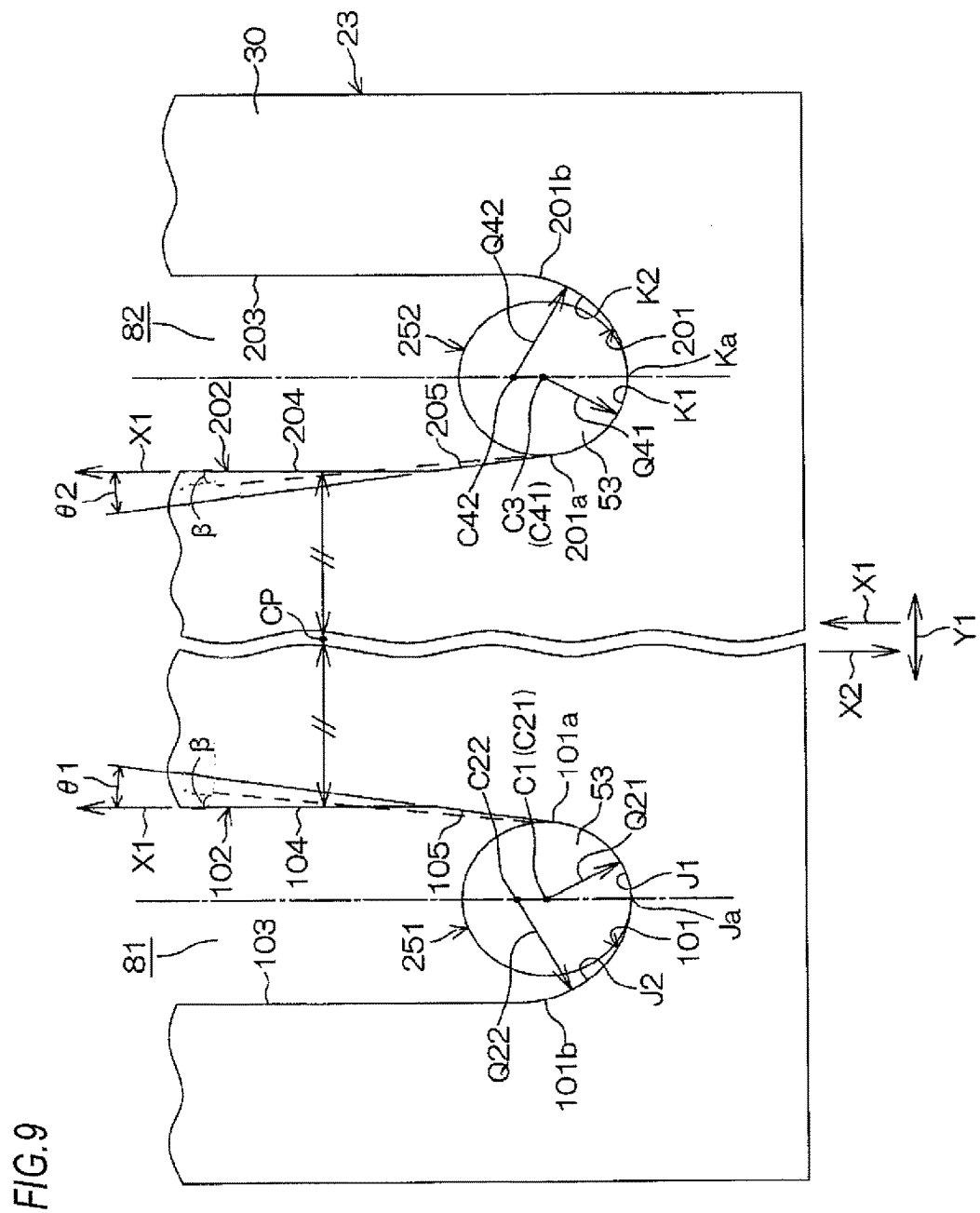
FIG. 9 is a diagrammatic view of long holes of the first plate and the suspension bolts, enlargedly showing a part of FIG. 7, and shows a state where the suspension bolts are in initial installed positions, hatchings of sections of the first plate and the suspension bolts being omitted.

Then, FIG. 9 shows relationships between the pair of long holes (first holes) 81, 82 of the first plate 30, and the large-diameter portions 53 functioning as the long-hole passing portion of the suspension bolts 251, 252 which are placed in initial installed positions with respect to the pair of long holes 81, 82. In FIG. 9, hatchings of sections of the first plate 30 and the suspension bolts 251, 252 are omitted.

The inner circumference 81a of the one long hole 81 includes: a recessed curved surface portion 101 which is disposed in an end portion in a direction X2 opposite to the column movement direction X1; a first inner edge portion 102 which is an inner edge portion on the side of the middle position CP (corresponding to the placement position of the resin pin 61 of the coupling/decoupling mechanism R1) between the pair of long holes 81, 82; and a second inner edge portion 103 which is opposed to the first inner edge portion 102.

A part of the outer circumference of the large-diameter portion 53 (long-hole passing portion) of the suspension bolt 251 which is in the initial installed position is placed so as to extend along a part of the recessed curved surface portion 101, and received by the recessed curved surface portion 101. Specifically, the recessed curved surface portion 101 includes a first arcuate surface portion J1 having a first center C21, and a second arcuate surface portion J2 which has a second center C22 that is offset from the first center C21 in the column movement direction X1, and which is connected to the first arcuate surface portion J1 through a connecting portion Ja. The radius of curvature Q22 of the second arcuate surface portion J2 with respect to the second center C22 is made larger than the radius of curvature Q21 of the first arcuate surface portion J1 with respect to the first center C21 (Q22>Q21).

In a state where the large-diameter portion (long-hole passing portion) of the suspension bolt 251 which is in the initial installed position is received by the recessed curved surface portion 101, the center C1 of the large-diameter portion 53 (long-hole passing portion) of the suspension bolt 251 is placed in a position which is substantially coincident with the first center C21 of the first arcuate surface portion J1. The radius of curvature of the large-diameter portion 53 is set equal to or slightly smaller than the radius of curvature Q21 of the first arcuate surface portion J1.

The first inner edge portion 102 includes a flat surface portion 104 which extends in the column movement direction X1, and a tapered surface portion 105 which extends in a tangential direction from one end portion 101a (corresponding to an end portion of the first arcuate surface portion J1) of the recessed curved surface portion 101, and which is crossedly connected to the flat surface portion 104. The second inner edge portion 103 is configured by a flat surface portion which extends from another end portion 101b (corresponding to an end portion of the second arcuate surface portion J2) of the recessed curved surface portion 101 in the column movement direction X1 that is a tangential direction.

The one long hole 81 and the other long hole 82 are structured in a laterally symmetrical manner. Namely, the inner circumference 82a of the other long hole 82 includes: a recessed curved surface portion 201 which is disposed in an end portion in the direction X2 opposite to the column movement direction X1; a first inner edge portion 202 which is an inner edge portion on the side of the middle position CP between the pair of long holes 81, 82; and a second inner edge portion 203 which is opposed to the first inner edge portion 202.

A part of the outer circumference of the large-diameter portion 53 (long-hole passing portion) of the suspension bolt 252 which is in the initial installed position is placed so as to extend along the recessed curved surface portion 201, and received by the recessed curved surface portion 201. Specifically, the recessed curved surface portion 201 includes a first arcuate surface portion K1 having a first center C41, and a second arcuate surface portion K2 which has a second center C42 that is offset from the first center C41 in the column movement direction X1, and which is connected to the first arcuate surface portion K1 through a connecting portion Ka. The radius of curvature Q42 of the second arcuate surface portion K2 with respect to the second center C42 is made larger than the radius of curvature Q41 of the first arcuate surface portion K1 with respect to the first center C41 (Q42>Q41).

In a state where the large-diameter portion (long-hole passing portion) of the suspension bolt 252 which is in the initial installed position is received by the recessed curved surface portion 201, the center C3 of the large-diameter portion 53 (long-hole passing portion) of the suspension bolt 252 is placed in a position which is substantially coincident with the first center C41 of the first arcuate surface portion K1. The radius of curvature of the large-diameter portion 53 is set equal to or slightly smaller than the radius of curvature Q41 of the first arcuate surface portion K1.

The first inner edge portion 202 includes a flat surface portion 204 which extends in the column movement direction X1, and a tapered surface portion 205 which extends in a tangential direction from one end portion 201a (corresponding to an end portion of the first arcuate surface portion K1) of the recessed curved surface portion 201, and which is crossedly connected to the flat surface portion 204. The second inner edge portion 203 is configured by a flat surface portion which extends from another end portion 201b (corresponding to an end portion of the second arcuate surface portion K2) of the recessed curved surface portion 201 in the column movement direction X1 that is a tangential direction.

The tapered surface portions 105, 205 of the pair of long holes 82, 82 are inclined oppositely to each other so as to reduce the gap (specifically, the gap between the flat surface portion 104) between the first inner edge portions 102, 202 of the pair of long holes 81, 82. Taper angles $\theta 1$, $\theta 2$ of the tapered surface portions 105, 205 of the long holes 81, 82 with respect to the column movement direction X1 are made equal to or larger than the friction angle $\beta$ (not shown) ($\theta 1 \geq \beta$, $\theta 2 \geq \beta$).

Figure 10:
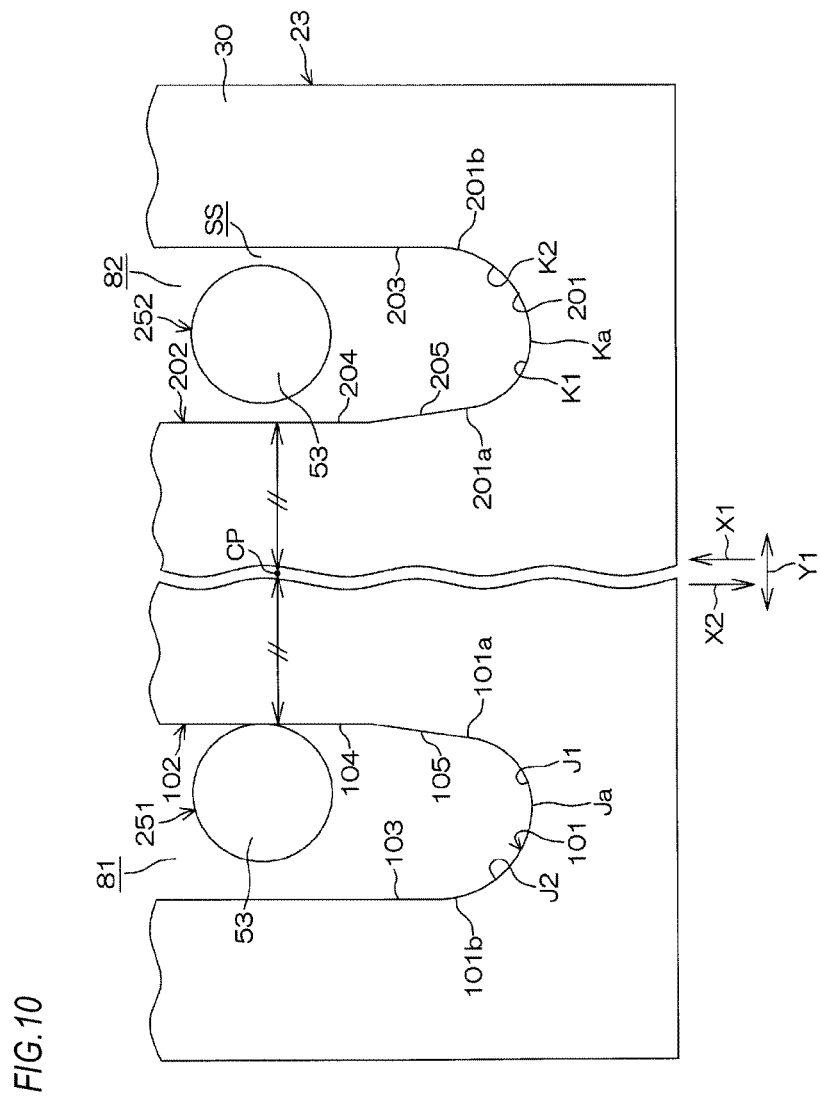
FIG. 10 is a diagrammatic view of, in the steering device of FIG. 1, the long holes of the first plate and the suspension bolts in a secondary collision, hatchings of sections of the first plate and the suspension bolts being omitted.

In a secondary collision, when a load is input to the steering shaft 3 in, for example, a direction oblique to the column movement direction X1 in a plan view, and, as shown in, for example, FIG. 10, the one suspension bolt 251 escapes from the recessed curved surface portion 101 which is the initial installed position of the long hole 81, and moves to the tapered surface portion 105 or flat surface portion 104 of the first inner edge portion 102, a gap SS is formed between the other suspension bolt 252 and the second inner edge portion 203 of the other long hole 82.

According to the embodiment, in a secondary collision, when the long-hole passing portion 53 of one suspension bolt (for example, the suspension bolt 251) slides over the first inner edge portion 102 of the corresponding one long hole 81, as shown in FIG. 10, the gap SS is formed between the long-hole passing portion 53 of the other suspension bolt (for example, the suspension bolt 252) and the second inner edge portion 203 of the corresponding other long hole 82. Therefore, the occurrence of prying can be suppressed, and stable shock absorption can be performed.

In the inner circumferences 81a, 82a of the long holes 81, 82, the taper angles $\theta 1$, $\theta 2$ of the tapered surface portions 105, 205 of the first inner edge portions 102, 202 on the side of the middle position CP between the long holes 81, 82 are set equal to or larger than the friction angle β (θ1≥β, θ2≥β). Also in the case where, in a plan view, the direction of the load input in a secondary collision is inclined with respect to the column movement direction X1 [in the case where the load has a load component in the direction Y1 (lateral direction) that is perpendicular to the column movement direction X1], therefore, the long-hole passing portion 53 of one suspension bolt (for example, the suspension bolt 251) which corresponds to the direction of the load input smoothly slides from the initial installed position (for example, a position which is partially along the recessed curved surface portion 101) of the corresponding long hole (for example, the long hole 81) to the flat surface portion 104 through, for example, the tapered surface portion 105 of the first inner edge portion 102 (see FIG. 10).

The first inner edge portion 102 is closer to the middle position CP between the pair of long holes 81, 82 than the second inner edge portion 103. Therefore, a rotation moment due to a reaction force which is applied from the first inner edge portion 102 to the suspension bolt 251 is smaller than that in an assumed case where the suspension bolt 251 butts against the second inner edge portion 103 which is on the remote side from the middle position CP between the pair of long holes 81, 82. As a result, the occurrence of prying can be further suppressed, and more stable shock absorption can be performed.

In the case where, although not shown, the long-hole passing portion 53 of the other suspension bolt 252 slides over the first inner edge portion 202 of the corresponding other long hole 82 in a secondary collision, a gap is formed between the long-hole passing portion 53 of the one suspension bolt 251 and the second inner edge portion 103 of the corresponding one long hole 81. Also in this case, the occurrence of prying can be suppressed, and stable shock absorption can be performed.

The invention is not limited to the above-described embodiment, and may be modified in various manners within the scope defined by the claims.

The application is based on Japanese Patent Application (No. 2013-148879) filed Jul. 17, 2013, and its disclosure is incorporated herein by reference.

INDUSTRIAL APPLICABILITY

According to the invention, it is possible to realize a steering device in which stable shock absorption is enabled.

DESCRIPTION OF THE REFERENCE NUMERALS AND SIGNS

1 . . . steering device, 2 . . . steering member, 3 . . . steering shaft, 13 . . . vehicle body-side member, 15 . . . steering column, 16 . . . upper jacket (movable jacket), 23 . . . stationary bracket, 24 . . . tilt bracket (movable bracket), 251, 252 . . . suspension bolt (suspension shaft), 26 . . . column bracket, 30 . . . first plate, 32 . . . second plate, 53 . . . large-diameter portion (long-hole passing portion), 81, 82 . . . long hole (first hole), 91, 92 . . . circular hole (second hole), 101, 102 . . . recessed curved surface portion, 101a, 201a . . . one end portion, 101b, 201b . . . other end portion, 102, 202 . . . first inner edge portion, 103, 203 . . . second inner edge portion, 104, 204 . . . flat surface portion, 105, 205 . . . tapered surface portion, CP . . . middle position (between paired long holes), C21, C41 . . . first center, C22, C42 . . . second center, J1, K1 . . . first arcuate surface portion, J2, K2 . . . second arcuate surface portion, SS . . . gap, T1, T2 . . . suspension mechanism, R1 . . . coupling/decoupling mechanism, θ1, θ2 . . . taper angle, X1 . . . column movement direction, X2 . . . direction opposite to column movement direction, Y1 . . . direction perpendicular to column movement direction

The invention claimed is:

1. A steering device comprising:
a stationary bracket which is fixed to a vehicle body-side member, and which includes a first plate;
a movable jacket which is configured to rotatably support a steering shaft in which a steering member is coupled to one end;
a movable bracket which is configured to support the movable jacket in a manner that, in a secondary collision, the movable bracket is moved together with the movable jacket in a column movement direction, and which includes a second plate that is opposed to the first plate; and
a pair of suspension mechanisms which include a pair of suspension shafts that couple the first plate and the second plate to each other while being passed through long holes which are a pair of first holes that are disposed in the first plate and that extend parallel to the column movement direction, and a pair of second holes of the second plate, the second holes respectively corresponding to the long holes, thereby suspending the movable jacket through the movable bracket, wherein a long-hole passing portion of each of the suspension shafts is moved, in a secondary collision, from an initial installed position along the corresponding long hole in the column movement direction, wherein
an inner circumference of each of the long holes includes: a recessed curved surface portion which is disposed in an end portion in a direction opposite to the column movement direction; a first inner edge portion which is an inner edge portion on a side of a middle position between the pair of long holes; and a second inner edge portion which is opposed to the first inner edge portion, and,
in a secondary collision, when one of the suspension shafts butts against the first inner edge portion of a corresponding one of the long holes, a gap is formed between the other suspension shaft and the second inner edge portion of the corresponding other long hole.

2. The steering device according to claim 1, wherein
the first inner edge portion of each of the long holes includes: a flat surface portion which linearly extends parallel to the column movement direction; and a tapered surface portion which extends in a tangential direction from an end portion of the recessed curved surface portion, and which is connected to the corresponding flat surface portion,
the tapered surface portions of the pair of long holes are inclined oppositely to each other so as to reduce a width between the flat surface portions of the pair of long holes, and
taper angles of the tapered surface portions with respect to the column movement direction are equal to or larger than a friction angle.

3. The steering device according to claim 2, wherein
the friction angle β is obtained by the Formula (1):
β=arctan(μ), where μ represents the coefficient of static friction.

4. The steering device according to claim 1, wherein,
when the other one of the suspension shafts butts against the first inner edge portion of the corresponding other long hole, a gap is formed between the one of the suspension shafts and the second inner edge portion of the corresponding one of the long holes.

* * * * *